Oct. 15, 1929.                E. A. MAU                 1,731,822
                              THERMOSTAT
                           Filed March 5, 1925

Inventor
Edward A. Mau.
By *S. Clay Lindsey*.
                                        His Attorney Patented Oct. 15, 1929

1,731,822

UNITED STATES PATENT OFFICE

EDWARD A. MAU, OF NEW BRITAIN, CONNECTICUT ASSIGNOR TO LANDERS, FRARY & CLARK, OF NEW BRITAIN, CONNECTICUT, A CORPORATION OF CONNECTICUT

THERMOSTAT

Application filed March 5, 1925. Serial No. 13,294.

This invention relates to thermostats of the type having a thermostatic strip or bar which flexes under temperature changes and which is employed to control an electric current. Thermostats of this type may be employed to advantage in connection with a flexible heating pad, blanket or the like, for the purpose of interrupting the circuit through the resistance element distributed in the pad, when a predetermined temperature is reached. It is, of course, obvious that they may be employed for other purposes.

One objection to thermostats of this type has been that sometimes they would buzz or hum and interefere with the reception of radio receiving apparatus. I am of the opinion that this buzzing or humming may be due to the fact that, when the thermostat, upon reaching a predetermined temperature, closes the circuit, an arc is produced between the thermostatic bar and its contact, with the result that the bar snaps back and then rebounds into engagement with the contact, whereupon another spark is produced which effects another snap back and rebound, and this sequence is repeated indefinitely or until the temperature of the thermostat becomes sufficiently high that a positive throw-off or cut-out is made.

The aim of the present invention is to provide an improved thermostat wherein the above noted objection is eliminated.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawing, wherein I have shown, for illustrative purposes, one of the many embodiments which the present invention may take:

Figure 1:
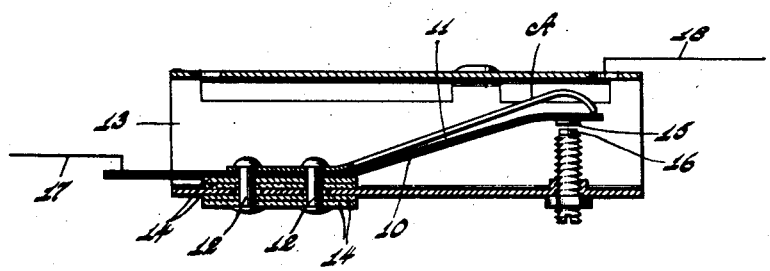
Figure 1 is a view showing in longitudinal section my improved thermostat.
Figure 2:
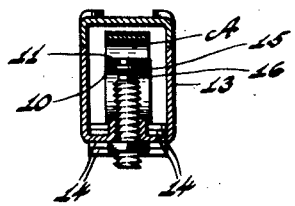
Fig. 2 is a transverse sectional view taken substantially on line 2—2 of Fig. 1.

Referring to the drawing, the thermostatic bar may be constructed of two strips 10 and 11 respectively formed of metals having different co-efficients of expansion, the strips being superimposed and suitably secured together. It may be assumed that the strip 10 is formed of brass, and the strip 11, which has the smaller co-efficient of expansion, is formed of iron or steel. The thermostatic bar is secured adjacent one end and in any suitable manner, as by means of rivets 12, to a support which may be in the form of a tubular casing 13. The thermostatic bar, which is insulated from the casing by pieces 14 of mica or the like, carries, adjacent its free end, a contact 15 adapted to engage a cooperating contact or terminal 16 which may be in the form of a screw adjustably carried by the tubular casing. One end 17 of the wire or circuit in which the thermostat is interposed may be connected to the thermostatic bar, and the other end 18 to the casing, as shown.

In accordance with the present invention, I provide means in heat conductive relation to the thermostatic bar for increasing the heat capacity thereof. This means, by preference, normally urges the thermostatic bar towards the contact 16. In the present illustrative disclosure, this means is in the form of a member or strip A secured at one end by the rivets 12 and having its other end engaging the thermostatic bar. This spring which is of uni-metallic or homogenous structure may be constructed of brass, for instance, and is in engagement with the iron portion 11 of the thermostatic bar. By preference, the free end of the spring A engages and presses upon the thermostatic bar at a point beyond the contact 15.

With the arrangement described, arcing of the thermostat and the resultant buzzing or humming, which heretofore has interfered with radio receiving sets, is completely eliminated. This result, which is brought about in a very simple and effective manner, may be due to the fact that the spring strip A increases the heat capacity of the thermostat and, since the strip A is always pressing against the thermostatic bar, the period of vibration of the assembly is changed.

I claim as my invention:

1. A thermostat of the character described having a relatively resilient thermostatic bar, fixed at one end, a contact member with which the bar is adapted to directly engage, and a uni-metallic spring member engaging said bar and normally urging and flexing the same towards said contact member.

2. A thermostat of the character described having a thermostatic bar secured at one end, a contact member with which the free end of said bar is adapted to engage, and a uni-metallic spring strip engaging said bar adjacent its free end and beyond said contact member and normally urging the same into engagement with said contact member.

3. A thermostat of the character described having a thermostatic bar secured adjacent one end, and a uni-metallic strip secured at one end to, and in engagement with, said bar and having its free end engaging said bar adjacent the free end of the latter for damping the vibration thereof.

4. A thermostat of the character described having a thermostatic bar formed of two strips of metal having different co-efficients of expansion, said bar being secured at one end and having its other end free, a contact member with which the free end of said bar is adapted to engage, and a curved uni-metallic spring strip engaging said bar at its opposite ends and normally urging the free end of said bar towards said contact member.

EDWARD A. MAU.